United States Patent Office.

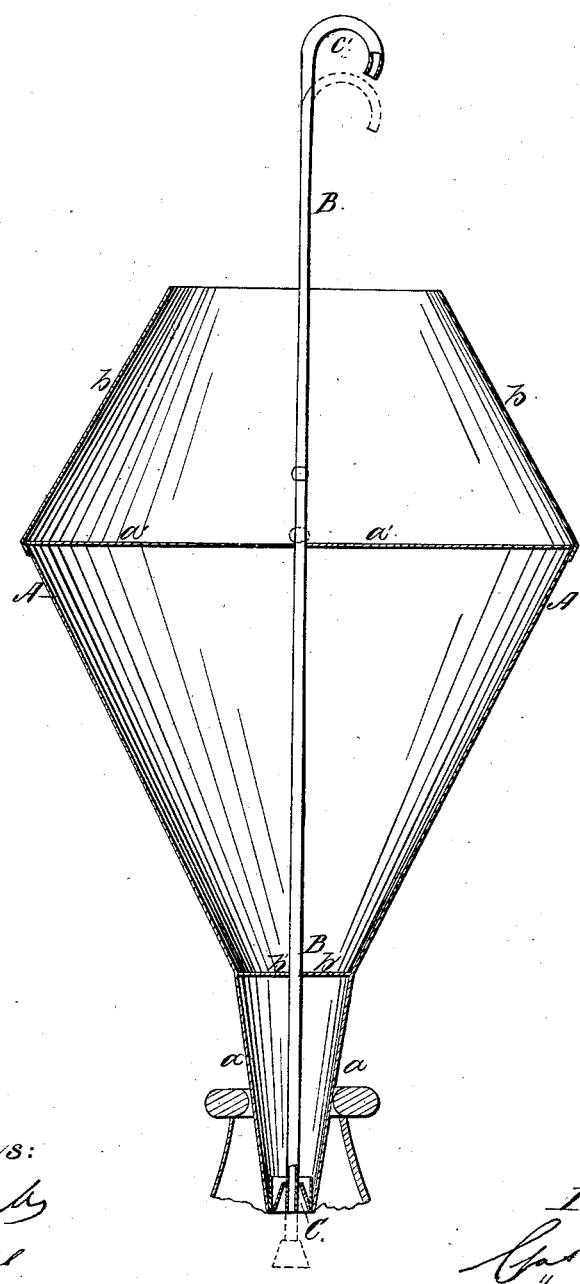

CHARLES CHINNOCK, OF BROOKLYN, NEW YORK.

*Letters Patent No. 82,087, dated September 15, 1868.*

IMPROVEMENT IN MEASURING-FUNNELS.

*The Schedule referred to in these Letters Patent and making part of the same.*

TO ALL WHOM IT MAY CONCERN:

Be it known that I, CHARLES CHINNOCK, of Brooklyn, in the county of Kings, and State of New York, have invented a new and useful Improvement in Measuring-Funnels; and I do hereby declare that the following is a full, clear, and exact description of the same, reference being had to the accompanying drawing, making a portion of this specification, which is a vertical transverse section of a measuring-funnel made according to my invention.

This invention consists in a stem, passed centrally through a suitably-shaped funnel, and furnished, at its lower end, with a valve, in such manner that, when the device is suspended by the stem, the bottom of the funnel will be closed by its own weight, the funnel being then suitable for use as a measuring-vessel, and, when the stem is released, as when the funnel is placed in the mouth of a jug, bottle, or like receptacle, the valve will recede, to open the funnel, to permit the egress of the contents thereof.

To enable others to understand the nature and construction of my invention, I will proceed to describe it with reference to the drawings.

A represents the funnel, of any suitable or desired capacity, furnished, at its lower portion, with the narrow tapering neck or nozzle $a$, and with its upper part contracted, as shown at $b$, in order to lessen the liability of spilling the liquid held therein. This funnel is furnished, at or near its central part, with a flat transverse bar, $a'$, and lower down within the funnel is a similar bar, $b'$, each of these bars being furnished with a hole at its middle. Passing downward through these holes, and centrally within the funnel, is a tubular stem, B, the upper end of which, above the top of the funnel, should be turned over, as indicated at $c'$, so that it may be easily held by the hand, and the lower end of which, at the extremity of the nozzle $a$, has secured thereto a tapering valve, C, which serves to close the bottom of the nozzle, this valve C being pressed within or against the lower end of the nozzle $a$, when the apparatus is suspended by the stem, as represented in the drawing. When the bottom is thus closed by the valve C, the funnel may be employed as a measuring-vessel when desired. When the funnel, as used for this purpose, is filled, its nozzle, $a$, is inserted into the mouth of the jug, bottle, or other receptacle designed to receive the contents thereof, which being done, and the stem B being released, the stem, with the valve attached thereto, is moved downward by its own weight, and that of the liquid pressing upon the valve, thus opening the bottom of the funnel, and permitting the contents of the funnel to flow therefrom into the jug or like receptacle, the air expelled from the jug or other receptacle by the liquid from the funnel passing out from such receptacle through the tubular stem B, thereby insuring the most efficient operation of the apparatus as a funnel.

What I claim as my invention, and desire to secure by Letters Patent, is—

The arrangement, within the funnel, of the stem B, carrying the valve C at its lower end, whereby the weight of the funnel closes the valve, when the latter is suspended by the stem for filling, substantially as herein set forth.

CHS. CHINNOCK.

Witnesses:
A. LE CLERC,
J. W. COOMBS.